US006837957B2

(12) United States Patent
Flynn et al.

(10) Patent No.: US 6,837,957 B2
(45) Date of Patent: Jan. 4, 2005

(54) METHOD FOR SEPARATING LABEL ASSEMBLY

(76) Inventors: Timothy J. Flynn, 18 Caloosa Rd., Key Largo, FL (US) 33037; Thomas E. Flynn, 7305 Gleneagle Cir., Crystal Lake, IL (US) 60014; Patrick J. Flynn, 107 Jennifer St., Redlands, CA (US) 92373

( * ) Notice: Subject to any disclaimer, the term of this patent is extended or adjusted under 35 U.S.C. 154(b) by 0 days.

(21) Appl. No.: 10/390,338

(22) Filed: Mar. 17, 2003

(65) Prior Publication Data

US 2004/0182507 A1 Sep. 23, 2004

(51) Int. Cl.[7] .................................................. B32B 31/18
(52) U.S. Cl. ........................ 156/252; 156/277; 156/289
(58) Field of Search ................................ 156/247–250, 156/252, 277, 289; 206/824

(56) References Cited

U.S. PATENT DOCUMENTS

| | | | | |
|---|---|---|---|---|
| 465,588 A | | 12/1891 | Wheeler | |
| 1,500,698 A | | 7/1924 | Wiehl | |
| 1,821,916 A | | 9/1931 | Acheson et al. | |
| 3,825,463 A | * | 7/1974 | Amann | 428/41.1 |
| 4,084,015 A | | 4/1978 | Patterson | |
| 5,334,432 A | | 8/1994 | Long | |
| 5,462,783 A | * | 10/1995 | Esselmann | 428/42.1 |
| 5,588,239 A | * | 12/1996 | Anderson | 40/630 |
| 5,716,688 A | * | 2/1998 | Burke et al. | 428/43 |
| 5,925,200 A | | 7/1999 | Grossman | |
| 5,997,683 A | * | 12/1999 | Popat | 156/277 |
| 6,054,009 A | | 4/2000 | Cote et al. | |
| 6,273,167 B1 | | 8/2001 | Miller | |
| 6,318,436 B1 | | 11/2001 | Hummell et al. | |
| 6,321,811 B1 | | 11/2001 | Atkinson et al. | |
| 6,347,654 B1 | | 2/2002 | Koch | |
| 6,363,987 B1 | | 4/2002 | Koch | |
| 6,405,777 B1 | | 6/2002 | Lebbad | |
| 6,408,918 B1 | | 6/2002 | Hummell et al. | |
| 6,431,238 B1 | | 8/2002 | Atkinson | |
| 2001/0025689 A1 | | 10/2001 | Barnet | |

* cited by examiner

*Primary Examiner*—Melvin C Mayes
*Assistant Examiner*—Sing P Chan
(74) *Attorney, Agent, or Firm*—Pauley Petersen & Erickson

(57) ABSTRACT

A label assembly having a face sheet adhered to a back sheet. A separation line includes at least one first tearable line of separation extending across the face sheet and a second tearable line of separation extending across the back sheet. Each first tearable line of separation is offset with respect to the second tearable line of separation. In a method for printing a plurality of portions of the label assembly, the label assembly is routed through a printer and print is applied to a first portion of the label assembly. The first portion is separated from a second portion and the second portion is routed through a printer and print is applied to the second portion of the label assembly.

20 Claims, 3 Drawing Sheets

METHOD FOR SEPARATING LABEL ASSEMBLY

BACKGROUND OF THE INVENTION

1. Field of the Invention

This invention relates to a separable label assembly having a face sheet adhered to a back sheet. This invention also relates to a method for separating the label assembly and a method for printing a plurality of portions of a label assembly.

2. Discussion of Related Art

Conventional label assembly sheets have a face sheet adhered to a back sheet. Conventional label assembly sheets can be run through a printer, for printing in a first area of the label assembly sheet. The entire label assembly sheet can then be passed through the printer to print in a second area of the label assembly sheet. However, when the label assembly sheet is passed through the printer with the same edge inserted into the printer, many computer programs require manipulation to reposition the print command from the first area to the second area.

With certain computer programs or software, the print command can remain the same, without different formatting. However, conventional label assembly sheets can be routed through a printer by inserting a first end of the label assembly sheet into the printer. Without reformatting the computer program associated with the printing commands, the conventional label assembly sheet can be rotated so that a different edge of the label assembly sheet is inserted into the printer.

For example, with conventional printing methods and label assembly sheets, a label assembly sheet can be routed through a printer, and printed upon an upper half of the label assembly sheet. The label assembly sheet can then be separated into two portions. Of the two portions, a printed or spent portion can be discarded and the remaining portion can be routed through the printer, as a one-half sheet piece, for printing on the second portion of the label assembly sheet, without reformatting the computer program or software.

It is often advantageous to separate the label assembly sheet into two or more pieces, each for individual routing through a printer. For example, if a label is removed from the label assembly sheet, the adhesive can flow into unintended areas that transfer the adhesive to printer components. The undesired adhesive in the printer can cease printing operations and can also destroy the printer.

There is an apparent need for a label assembly sheet that can be easily separated, particularly without leaving rough edges and/or adhesive residue.

SUMMARY OF THE INVENTION

It is one object of this invention to provide an apparatus for separating a label assembly sheet, wherein a face sheet has one tearable line of separation which is offset with respect to a second tearable line of separation of a back sheet.

It is another object of this invention to provide a method for separating a label assembly sheet, wherein the face sheet is separated along at least one first tearable line of separation and the back sheet is separated along a second tearable line of separation which is offset with respect to the first tearable line of separation.

It is still another object of this invention to provide a method for printing a plurality of portions of a label assembly.

The above and other objects of this invention are accomplished with a label assembly that has a face sheet, a back sheet and a layer of adhesive positioned between the face sheet and the back sheet. The face sheet has at least one first tearable line of separation that extends across the face sheet. Each back sheet has a second tearable line of separation that extends across the back sheet. The first tearable line of separation is preferably offset with respect to the second tearable line of separation.

When a first portion of the label assembly is separated with respect to a second portion of the label assembly, along the separation line that divides the label assembly into at least two portions, the face sheet is separated along the first tearable line of separation and the back sheet is separated along the second tearable line of separation.

In one embodiment of this invention, each second tearable line of separation in the back sheet corresponds to two first tearable lines of separation in the face sheet. In such embodiment, the two first tearable lines of separation can be each positioned on an opposite side of the second tearable line of separation. A strip of the face sheet between the two first tearable lines of separation can be removed to expose the second tearable line of separation within the back sheet. After the strip is removed with respect to the face sheet, the back sheet can be easily separated along the second tearable line of separation.

In a method for separating the label assembly according to this invention, the face sheet is separated along the first tearable line of separation and the back sheet is separated along the second tearable line of separation. In an embodiment where a strip is formed between two first tearable lines of separation, the strip can be removed to expose the second tearable line of separation. The back sheet can then be separated into two portions.

In different embodiments according to this invention, the first tearable line of separation and/or the second tearable line of separation can include a die cut line, a laser die cut line, a score cut line, a perforation line, a microperforation line, a chemically etched line, a liquid etched line, a gas etched line and/or any other suitable tearable line of separation or line of weakening. The tearable line of separation of this invention can be laser cut and/or knife cut.

In one embodiment of this invention, in a method for printing a plurality of portions of a label assembly, the label assembly is routed through a printer and print is applied to a first portion of the label assembly. The first portion of the label assembly is separated from the second portion of the label assembly, along the first tearable line of separation and the second tearable line of separation. The second portion of the label assembly is then routed through a printer and print is applied to the second portion of the label assembly.

BRIEF DESCRIPTION OF THE DRAWINGS

The features of this invention can be better understood when the following specification is read in view of the drawings, wherein.

DETAILED DESCRIPTION OF THE PRESENTLY PREFERRED EMBODIMENTS

Figure 1:
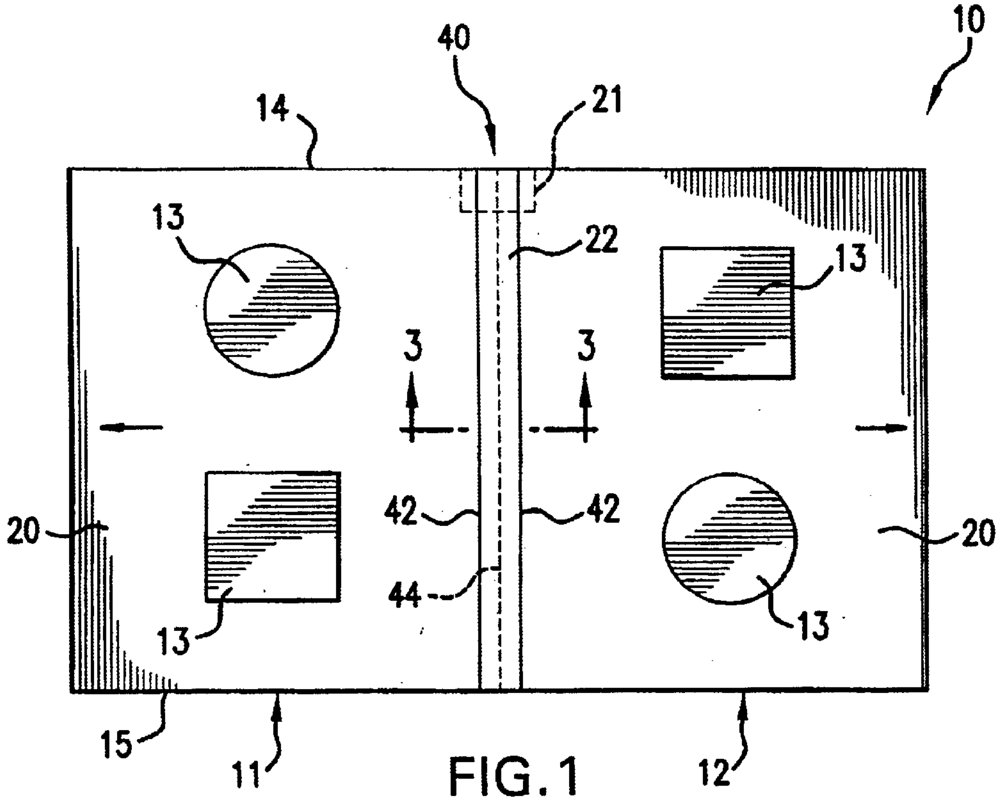
FIG. 1 is a top view of a label assembly, according to one embodiment of this invention.
Figure 2:
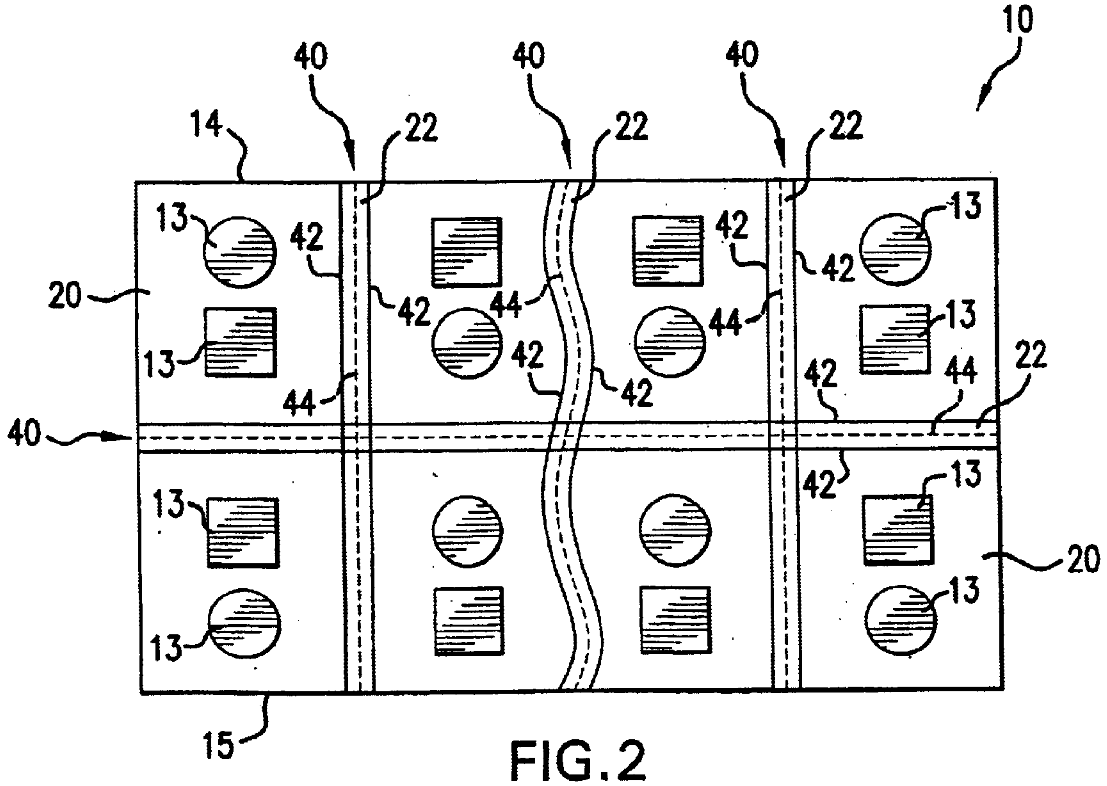
FIG. 2 is a top view of a label assembly, according to another embodiment of this invention.

FIG. 1 shows one embodiment of label assembly 10 and FIG. 2 shows a different embodiment of label assembly 10. As shown in FIG. 1, label assembly 10 can be separated along separation line 40 to divide label assembly 10 into portion 11 and portion 12. In the embodiment shown in FIG. 2, label assembly 10 can be divided into as many as eight portions. As shown in FIG. 2, four separation lines 40 are used to divide label assembly 10. It is apparent that any other suitable number of separation lines 40 can be used to divide label assembly 10 into any suitable number of equal or unequal portions.

Figure 3:
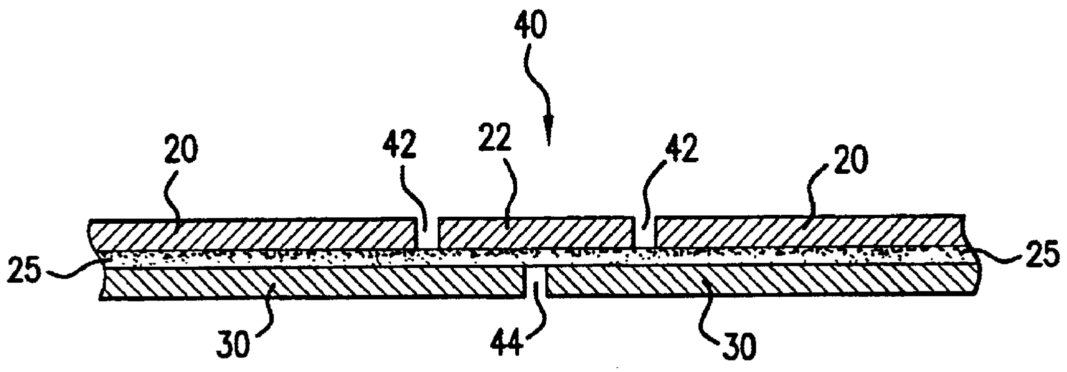
FIG. 3 is a sectional view taken along line 3—3, as shown in FIG. 1, showing a face sheet adhered to a back sheet.
Figure 4:
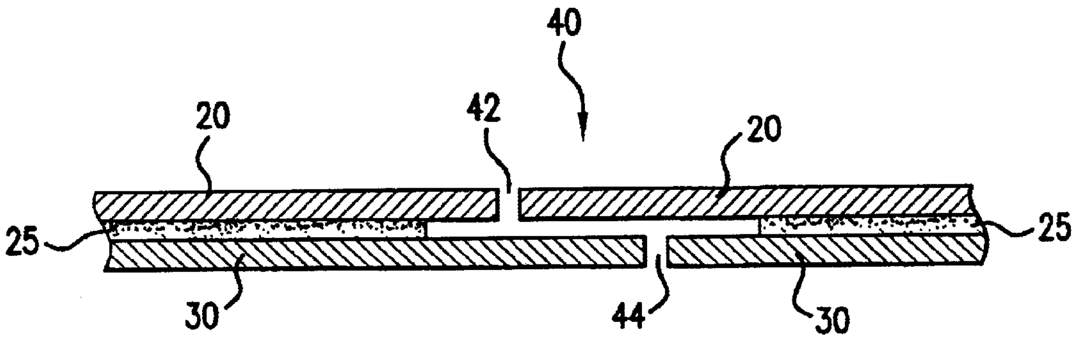
FIG. 4 is a sectional view taken in a similar direction as shown in FIG. 3, but according to another embodiment of this invention.

As shown in FIGS. 3 and 4, a layer of adhesive 25 is positioned between face sheet 20 and back sheet 30. Adhesive 25 adheres to face sheet 20 more than it adheres to back sheet 30. This feature allows face sheet 20 to be removed with respect to back sheet 30, so that the adhesive 25 adheres to face sheet 20, for example to form an adhesive label.

Face sheet 20 and back sheet 30 are preferably but not necessarily coextensive with respect to each other. In other embodiments of this invention, face sheet 20 can have different dimensions and/or different shapes, as compared to back sheet 30.

As shown in FIGS. 1–4, separation line 40 is used to divide label assembly 10 into at least two portions 11 and 12. In one embodiment of this invention, separation line 40 comprises at least one tearable line 42 extending across face sheet 20 and tearable line 44 extending across back sheet 30. FIG. 3 shows separation line 40 comprising two tearable lines 42 and one tearable line 44. FIG. 4 shows another embodiment where separation line 40 comprises one tearable line 42 and one tearable line 44.

As shown in FIGS. 3 and 4, each tearable line 42 is offset with respect to tearable line 44. As shown in FIG. 3, adhesive layer 25 extends entirely across separation line 40. As shown in FIG. 4, adhesive layer 25 stops short of and surrounds separation line 40, so that there is no adhesive at or around tearable line 42 and/or tearable line 44.

As used throughout this specification and in the claims, the phrase tearable line and/or the phrase tearable line of separation is intended to relate to a line of weakening of the structure of face sheet 20 and/or back sheet 30. The line of weakening has a weakened structural area along which face sheet 20 and/or back sheet 30 can be separated. Each tearable line or line of weakening, according to this invention, comprises at least one of a die cut line, a laser die cut line, a score cut line, a perforation line, a microperforation line, a chemically etched line, a liquid etched line and/or a gas etched line. Tearable line 42 and/or tearable line 44 of this invention may comprise any other suitable separation line or line of weakening known to those skilled in the art of label assemblies.

As shown in FIG. 1, separation line 40 comprises two tearable lines 42, each positioned on a different side of tearable line 44. Removable strip 22 is formed between both tearable lines 42. As shown in FIG. 1, strip 22 can be removed to expose tearable line 44. When strip 22 is removed with respect to face sheet 20 and/or back sheet 30, portion 111 of label assembly 10 can be easily separated from portion 12 of label assembly 10.

As shown in FIG. 1, lift tab 21 can be formed as part of strip 22. Lift tab 21 simplifies the method step of removing strip 22 from label assembly 10. In one embodiment of this invention, adhesive 25 is positioned between face sheet 20 and back sheet 30 at the area defined by lift tab 21. In another embodiment of this invention, adhesive layer 25 surrounds the area defined by lift tab 21, between face sheet 20 and back sheet 30, so that lift tab 21 is easily removed from a non-adhesive area with respect to back sheet 30.

As shown in FIG. 1, tearable line 44 intersects lift tab 21. This arrangement also simplifies the step of removing strip 22 with respect to back sheet 30.

Figure 5:
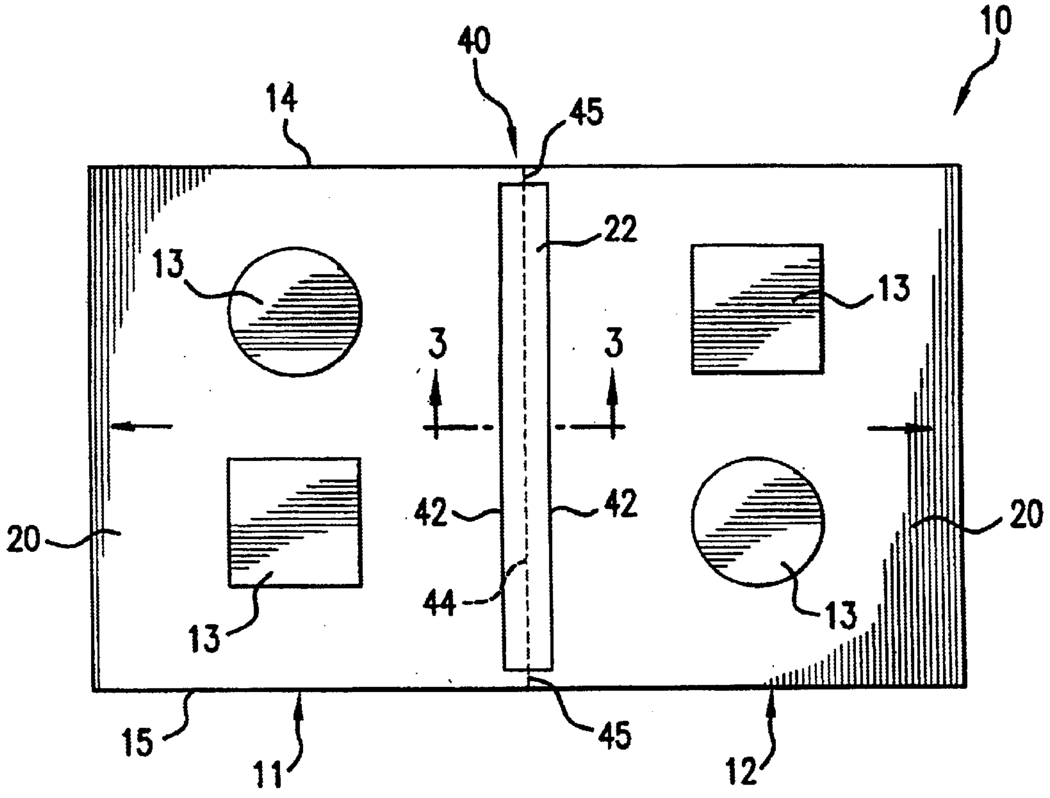
FIG. 5 is a top view of a label assembly, according to another embodiment of this invention.

In one embodiment of this invention, each tearable line 42 and 44 extends from edge portion 14 to edge portion 15, each of label assembly 10. In another embodiment of this invention, such as shown in FIG. 5, tearable line 42 and/or tearable line 44 stop short of edge portion 14 and/or edge portion 15. Tearable line 42 and/or tearable line 44 can stop short of or can extend all of the way to edge portion 14 and/or edge portion 15, depending upon the particular design of label assembly 10. As shown in the embodiment of FIG. 5, tearable line 42 stops short of both edge portions 14 and 15, and tearable line 45 is positioned between the end of tearable line 44 and each of edge portions 14 and 15. This embodiment provides structure that adds strength to label assembly 10, so that label assembly 10 can be routed through rollers and other mechanical handlers, during a printing process or when manufacturing the labels, without breaking apart.

In one embodiment of this invention, a path of tearable line 42 generally follows a path of tearable line 44. As shown in FIG. 1, each tearable line 42 and tearable line 44 are linear. In another embodiment as shown in FIG. 2, at least one separation line 40 follows a non-linear path. As shown in FIG. 2 the central vertical separation line 40 comprises two non-linear tearable lines 42 and one non-linear tearable line 44. Any tearable line 42 and/or tearable line 44 can have a linear and/or non-linear path, depending upon the particular design of label assembly 10.

In a method for separating label assembly 10, according to this invention, face sheet 20 is separated along at least one tearable line 42 and back sheet 30 is separated along tearable line 44 which is offset with respect to tearable line 42. In one embodiment of this invention, strip 22 of face sheet 20 is removed from label assembly 10, to expose tearable line 44. Once tearable line 44 is exposed, label assembly 10 can be easily separated into portion 11 and portion 12, or more portions.

Any suitable force can be applied to lift tab 21 and/or strip 22, to remove strip 22. With many label assemblies 10, fingers of a user clamp together to grip and pull lift tab 21 and/or strip 22. The force moves lift tab 21 and/or strip 22 in a direction away from label assembly 10.

Tearable line 42 and/or tearable line 44 can be separated along any suitable tearable line or line of weakening. Any suitable die cut line provides a sharp and clean edge along tearable line 42 and/or tearable line 44.

Before label assembly 10 is separated, label assembly 10 is routed through a printer, such as a laser printing device, an ink jet printing device, or any other suitable printing device that can print text upon face sheet 20 of label assembly 10.

When first routed through the printer, print is applied to portion 11 of label assembly 10. After label assembly 10 is divided into two or more portions 1 and 12, a second portion, such as portion 12 shown in FIG. 1, which represents less than the entire label assembly 10 is again routed through a printer and print is applied to the second portion, such as portion 12 shown in FIG. 1.

According to one embodiment of this invention, a method for printing a plurality of portions of label assembly 10, begins with routing label assembly 10 through a printer and printing on a first portion of label assembly 10. The first portion is separated from a second portion of label assembly 10, along at least one tearable line 42 of face sheet 20 and along tearable line 44 of back sheet 30, wherein each tearable line 42 is offset with respect to tearable line 44. The second portion of label assembly 10 is then routed through a printer and print is applied to the second portion of label assembly 10. According to the method of this invention, more than two portions of label assembly 10 can be separated and/or routed through the printer.

FIG. 1 shows portion 11 having two labels 13, with a first shape on a first side and a second shape on a second side. Also as shown in FIG. 1, portion 12 has two labels 13, with the second shape on the first side and the first shape on the second side. For example, portion 11 can be inserted into a printer, in a direction of the arrow shown on portion 11. Label assembly 10 can be separated and then portion 12 can be routed through a printer, in a direction of the arrow shown on portion 12, to print on portion 12.

The design and shape of label assembly 10, the type of tearable line 42 and/or tearable line 44, as well as the type of tearable line 42 and/or tearable line 44, can be used to vary the design and structure of label assembly 10. Different layouts of adhesive 25 can be accomplished by different manufacturing processes known to those skilled in the art of label assemblies, which for example can be used to provide a non-adhesive area at or near lift tab 21.

Different materials can be used for face sheet 20, back sheet 30 and/or adhesive 25, which are known to those skilled in the art of label assemblies.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for separating a label assembly having a face sheet adhered to a back sheet, the method comprising:

removing a strip on the face sheet positioned between two corresponding first tearable lines of separation each extending between a first edge portion and an opposing second edge portion of the label assembly, and exposing a second tearable line of separation on the back sheet;

separating the back sheet along the second tearable line of separation extending between the first edge portion and the second edge portion of the label assembly which is offset with respect to each first tearable line of separation to separate a first portion of the label assembly and a second portion of the label assembly; and routing a separated portion through a printer.

2. The method according to claim 1, further comprising removing a strip of the face sheet positioned between two corresponding first tearable lines of separation each positioned on opposite sides of the second tearable line of separation.

3. The method according to claim 2, wherein a force is applied to a lift tab attached to the strip for removing the strip.

4. The method according to claim 3, wherein the force moves the lift tab away from a non-adhesive area between the face sheet and the back sheet.

5. The method according to claim 2, wherein removing the strip with respect to the back sheet separates the back sheet into at least two portions.

6. The method according to claim 1, wherein each of the at least one first tearable line is separated along at least one of a die cut line, a laser die cut line, a score cut line, a perforation line, a microperforation line, a chemically etched line, a liquid etched line and a gas etched line of the face sheet.

7. The method according to claim 1, wherein each of the at least one second tearable line is separated along at least one of a die cut line, a laser die cut line, a score cut line, a perforation line, a microperforation line, a chemically etched line, a liquid etched line and a gas etched line of the back sheet.

8. The method according to claim 1, wherein the back sheet is separated entirely along a die cut line.

9. The method according to claim 1, wherein the label assembly is routed through a printer before the label assembly is separated.

10. The method according to claim 9, wherein a separated portion of the label assembly is routed through the printer.

11. A method for printing a plurality of portions of a label assembly having a face sheet adhered to a back sheet, the method comprising:

routing the label assembly through a printer and printing on a first portion of the label assembly;

removing a strip on the face sheet positioned between two corresponding first tearable lines of separation each extending between a first edge portion and an opposing second edge portion of the label assembly, and exposing a second tearable line of separation on the back sheet;

separating the first portion of the label assembly from a second portion of the label assembly along the second tearable line of separation, wherein each first tearable line of separation is offset with respect to the second tearable line of separation; and routing the second portion of the label assembly through a printer and printing on the second portion of the label assembly.

12. The method according to claim 11, further comprising removing a strip of the face sheet positioned between two corresponding first tearable lines of separation each positioned on opposite sides of the second tearable line of separation.

13. The method according to claim 12, wherein a force is applied to a lift tab attached to the strip for removing the strip.

14. The method according to claim 13, wherein the force moves the lift tab away from a non-adhesive area between the face sheet and the back sheet.

15. The method according to claim 12, wherein removing the strip with respect to the back sheet separates the back sheet into at least two portions.

16. The method according to claim 11, wherein the first tearable line is separated along at least one of a die cut line, a laser die cut line, a score cut line, a perforation line, a microperforation line, a chemically etched line, a liquid etched line and a gas etched line of the face sheet.

17. The method according to claim 11, wherein each of the at least one second tearable line is separated along at least one of a die cut line, a laser die cut line, a score cut line, a perforation line, a microperforation line, a chemically etched line, a liquid etched line and a gas etched line of the back sheet.

18. The method according to claim 11, wherein the back sheet is separated entirely along a die cut line.

19. The method according to claim 11, wherein the label assembly is routed through a printer before the label assembly is separated.

20. The method according to claim 19, wherein the label assembly is routed through the printer after the label assembly is separated.

* * * * *

UNITED STATES PATENT AND TRADEMARK OFFICE
CERTIFICATE OF CORRECTION

PATENT NO. : 6,837,957 C1
APPLICATION NO. : 90/010761
DATED : December 12, 2012
INVENTOR(S) : Timothy J. Flynn et al.

It is certified that error appears in the above-identified patent and that said Letters Patent is hereby corrected as shown below:

In the Claims:

Column 1, line 23 - Column 4, line 21, delete Claims 21-32 and insert the replacement claims 21-32 as follows:

--21. A method for separating a label assembly having a face sheet adhered to a back sheet, the method comprising:

removing a strip on the face sheet positioned between two corresponding first tearable lines of separation each extending between a first edge portion and an opposing second edge portion of the label assembly, and exposing a second tearable line of separation on the back sheet, the second tearable line of separation including a portion intersecting with the face sheet upon removal of the strip;

separating the back sheet along the second tearable line of separation extending between the first edge portion and the second edge portion of the label assembly which is offset with respect to each first tearable line of separation to separate a first portion of the label assembly and a second portion of the label assembly; and routing a separated portion through a printer.

22. A method for printing a plurality of portions of a label assembly having a face sheet adhered to a back sheet, the method comprising:

routing the label assembly through a printer and printing on a first portion of the label assembly;

removing a strip on the face sheet positioned between two corresponding first tearable lines of separation each extending between a first edge portion and an opposing second edge portion of the label assembly, and exposing a second tearable line of Signed and Sealed this
Twenty-third Day of April, 2013

Teresa Stanek Rea
*Acting Director of the United States Patent and Trademark Office* separation on the back sheet, the second tearable line of separation including a portion intersecting with the face sheet upon removal of the strip;

separating the first portion of the label assembly from a second portion of the label assembly along the second tearable line of separation, wherein each first tearable line of separation is offset with respect to the second tearable line of separation; and routing the second portion of the label assembly through a printer and printing on the second portion of the label assembly.

23. A method for separating a label assembly having a face sheet adhered to a back sheet, the method comprising:

removing a strip on the face sheet positioned between two corresponding first tearable lines of separation each extending between and stopping short of a first edge portion and an opposing second edge portion of the label assembly, and exposing a second tearable line of separation on the back sheet, with the strip removed the second tearable line of separation intersecting the face sheet;

separating the back sheet along the second tearable line of separation extending between the first edge portion and the second edge portion of the label assembly which is offset with respect to each first tearable line of separation to separate a first portion of the label assembly and a second portion of the label assembly; and routing a separated portion through a printer.

24. The method according to claim 23, wherein the second tearable line of separation intersects a structure of the face sheet.

25. The method according to claim 23, wherein the second tearable line of separation intersects a tab of the face sheet.

26. A method for printing a plurality of portions of a label assembly having a face sheet adhered to a back sheet, the method comprising:

routing the label assembly through a printer and printing on a first portion of the label assembly;

removing a strip on the face sheet positioned between two corresponding first tearable lines of separation each extending between and stopping short of a first edge portion and an opposing second edge portion of the label assembly, and exposing a second tearable line of separation on the back sheet;

separating the first portion of the label assembly from a second portion of the label assembly along the second tearable line of separation, wherein each first tearable line of separation is offset with respect to the second tearable line of separation, with the strip removed the second tearable line of separation intersecting the face sheet; and routing the second portion of the label assembly through a printer and printing on the second portion of the label assembly.

27. The method according to claim 26, wherein the second tearable line of separation intersects a structure of the face sheet.

28. The method according to claim 26, wherein the second tearable line of separation intersects a tab of the face sheet.

29. A method for separating a label assembly having a face sheet adhered to a back sheet, the method comprising:

removing a strip on the face sheet positioned between two corresponding first tearable lines of separation each extending between and stopping short of a first edge portion and an opposing second edge portion of the label assembly, and exposing a second tearable line of separation on the back sheet, the second tearable line of separation stopping short of the first edge portion and a third tearable line of separation positioned between an end of the second tearable line of separation and the first edge portion;

separating the back sheet along the second tearable line of separation and the third tearable line of separation extending between the first edge portion and the second edge portion of the label assembly which is offset with respect to each first tearable line of separation to separate a first portion of the label assembly and a second portion of the label assembly; and routing a separated portion through a printer.

30. The method according to claim 29, wherein the second tearable line of separation stops short of the second edge portion, and a third tearable line of separation is positioned between each end of the second tearable line of separation and the first edge portion or the second edge portion.

31. A method for printing a plurality of portions of a label assembly having a face sheet adhered to a back sheet, the method comprising:

routing the label assembly through a printer and printing on a first portion of the label assembly;

removing a strip on the face sheet positioned between two corresponding first tearable lines of separation each extending between and stopping short of a first edge portion and an opposing second edge portion of the label assembly, and exposing a second tearable line of separation on the back sheet, the second tearable line of separation stopping short of the first edge portion and a third tearable line of separation positioned between an end of the second tearable line of separation and the first edge portion;

separating the first portion of the label assembly from a second portion of the label assembly along the second tearable line of separation and the third tearable line of separation, wherein each first tearable line of separation is offset with respect to the second tearable line of separation; and routing the second portion of the label assembly through a printer and printing on the second portion of the label assembly.

32. The method according to claim 31, wherein the second tearable line of separation stops short of the second edge portion, and a third tearable line of separation is positioned between each end of the second tearable line of separation and the first edge portion or the second edge portion.--.

US006837957C1

(12) EX PARTE REEXAMINATION CERTIFICATE (9434th)

United States Patent

Flynn et al.

(10) Number: US 6,837,957 C1

(45) Certificate Issued: Dec. 12, 2012

(54) METHOD FOR SEPARATING LABEL ASSEMBLY

(75) Inventors: Timothy J. Flynn, Key Largo, FL (US); Thomas E. Flynn, Crystal Lake, IL (US); Patrick J. Flynn, Redlands, CA (US)

(73) Assignee: Continental Datalabel, Inc., Elgin, IL (US)

Reexamination Request:
No. 90/010,761, Dec. 7, 2009

Reexamination Certificate for:

| | |
|---|---|
| Patent No.: | **6,837,957** |
| Issued: | **Jan. 4, 2005** |
| Appl. No.: | **10/390,338** |
| Filed: | **Mar. 17, 2003** |

(51) Int. Cl.
*G09F 3/02* (2006.01)
*B41J 3/407* (2006.01)

(52) U.S. Cl. ......................... 156/252; 156/277; 156/289

(58) Field of Classification Search ........................ None
See application file for complete search history.

(56) References Cited

To view the complete listing of prior art documents cited during the proceeding for Reexamination Control Number 90/010,761, please refer to the USPTO's public Patent Application Information Retrieval (PAIR) system under the Display References tab.

*Primary Examiner* — Elizabeth McKane

(57) ABSTRACT

A label assembly having a face sheet adhered to a back sheet. A separation line includes at least one first tearable line of separation extending across the face sheet and a second tearable line of separation extending across the back sheet. Each first tearable line of separation is offset with respect to the second tearable line of separation. In a method for printing a plurality of portions of the label assembly, the label assembly is routed through a printer and print is applied to a first portion of the label assembly. The first portion is separated from a second portion and the second portion is routed through a printer and print is applied to the second portion of the label assembly.

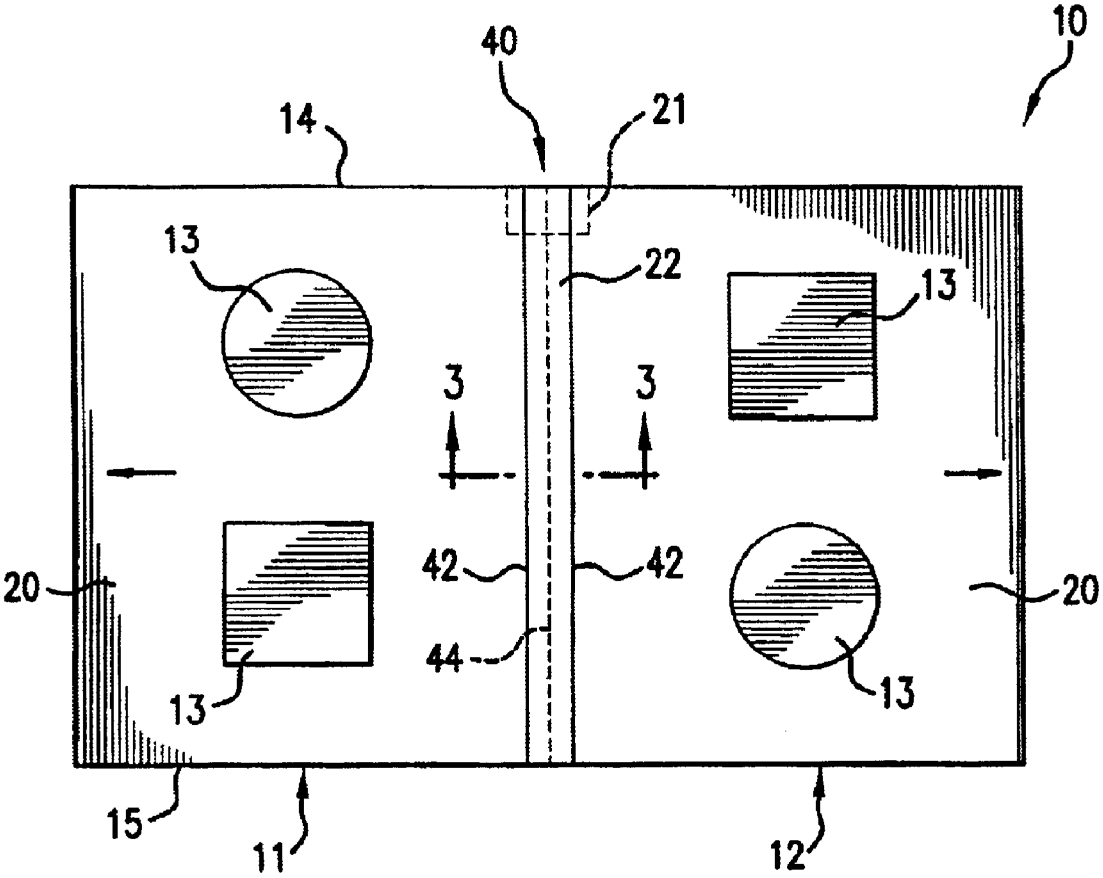

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 4, 13 and 14 is confirmed.

Claims 1, 2, 5-12 and 15-20 are cancelled.

New claims 21-32 are added and determined to be patentable.

*21. A method for separating a label assembly having a face sheet adhered to a back sheet, the method comprising:*

*after printing on a first portion of the label assembly, removing a strip on the face sheet positioned between two corresponding first tearable lines of separation each extending between a first edge portion and an opposing second edge portion of the label assembly, and exposing a second tearable line of separation on the back sheet;*

*separating the back sheet along the second tearable line of separation extending between the first edge portion and the second edge portion of the label assembly which is offset with respect to each first tearable line of separation to separate the first portion of the label assembly and a second portion of the label assembly; and*

*routing a separated portion through a printer.*

*22. A method for separating a label assembly having a face sheet adhered to a back sheet, the method comprising:*

*removing a strip on the face sheet positioned between two corresponding first tearable lines of separation each extending between a first edge portion and an opposing second edge portion of the label assembly, and exposing a non-linear second tearable line of separation on the back sheet;*

*separating the back sheet along the non-linear second tearable line of separation extending between the first edge portion and the second edge portion of the label assembly which is offset with respect to each first tearable line of separation to separate a first portion of the label assembly and a second portion of the label assembly; and*

*routing a separated portion through a printer.*

*23. A method for separating a label assembly having a face sheet adhered to a back sheet, the method comprising:*

*removing a strip on the face sheet positioned between two corresponding first tearable lines of separation each extending between a first edge portion and an opposing second edge portion of the label assembly, and exposing a second tearable line of separation on the back sheet, the second tearable line of separation including a portion intersecting with the face sheet upon removal of the strip;*

*separating the back sheet along the second tearable line of separation extending between the first edge portion and the second edge portion of the label assembly which is offset with respect to each first tearable line of separation to separate a first portion of the label assembly and a second portion of the label assembly; and*

*routing a separated portion through a printer.*

*24. A method for printing a plurality of portions of a label assembly having a face sheet adhered to a back sheet, the method comprising:*

*before the label assembly is separated, routing the label assembly through a printer and printing on a first portion of the label assembly;*

*removing a strip on the face sheet positioned between two corresponding first tearable lines of separation each extending between a first edge portion and an opposing second edge portion of the label assembly, and exposing a second tearable line of separation on the back sheet;*

*separating the first portion of the label assembly from a second portion of the label assembly along the second tearable line of separation, wherein each first tearable line of separation is offset with respect to the second tearable line of separation; and*

*routing the second portion of the label assembly through a printer and printing on the second portion of the label assembly.*

*25. A method for printing a plurality of portions of a label assembly having a face sheet adhered to a back sheet, the method comprising:*

*routing the label assembly through a printer and printing on a first portion of the label assembly;*

*removing a strip on the face sheet positioned between two corresponding first tearable lines of separation each extending between a first edge portion and an opposing second edge portion of the label assembly, and exposing a non-linear second tearable line of separation on the back sheet;*

*separating the first portion of the label assembly from a second portion of the label assembly along the non-linear second tearable line of separation, wherein each first tearable line of separation is offset with respect to the non-linear second tearable line of separation; and*

*routing the second portion of the label assembly through a printer and printing on the second portion of the label assembly.*

*26. A method for printing a plurality of portions of a label assembly having a face sheet adhered to a back sheet, the method comprising:*

*routing the label assembly through a printer and printing on a first portion of the label assembly;*

*removing a strip on the face sheet positioned between two corresponding first tearable lines of separation each extending between a first edge portion and an opposing second edge portion of the label assembly, and exposing a second tearable line of separation on the back sheet, the second tearable line of separation including a portion intersecting with the face sheet upon removal of the strip;*

*separating the first portion of the label assembly from a second portion of the label assembly along the second tearable line of separation, wherein each first tearable line of separation is offset with respect to the second tearable line of separation; and*

*routing the second portion of the label assembly through a printer and printing on the second portion of the label assembly.*

*27. A method for separating a label assembly having a face sheet adhered to a back sheet, the method comprising:*

*removing a strip on the face sheet positioned between two corresponding first tearable lines of separation each extending between and stopping short of a first edge*

*portion and an opposing second edge portion of the label assembly, and exposing a second tearable line of separation on the back sheet, with the strip removed the second tearable line of separation intersecting the face sheet;*

*separating the back sheet along the second tearable line of separation extending between the first edge portion and the second edge portion of the label assembly which is offset with respect to each first tearable line of separation to separate a first portion of the label assembly and a second portion of the label assembly; and*

*routing a separated portion through a printer.*

*28. The method according to claim 27, wherein the second tearable line of separation intersects a structure of the face sheet.*

*29. The method according to claim 27, wherein the second tearable line of separation intersects a tab of the face sheet.*

*30. A method for printing a plurality of portions of a label assembly having a face sheet adhered to a back sheet, the method comprising:*

*routing the label assembly through a printer and printing on a first portion of the label assembly;*

*removing a strip on the face sheet positioned between two corresponding first tearable lines of separation each extending between and stopping short of a first edge portion and an opposing second edge portion of the label assembly, and exposing a second tearable line of separation on the back sheet;*

*separating the first portion of the label assembly from a second portion of the label assembly along the second tearable line of separation, wherein each first tearable line of separation is offset with respect to the second tearable line of separation, with the strip removed the second tearable line of separation intersecting the face sheet; and*

*routing the second portion of the label assembly through a printer and printing on the second portion of the label assembly.*

*31. The method according to claim 30, wherein the second tearable line of separation intersects a structure of the face sheet.*

*32. The method according to claim 30, wherein the second tearable line of separation intersects a tab of the face sheet.*

* * * * *

US006837957C2

(12) EX PARTE REEXAMINATION CERTIFICATE (10216th)

United States Patent

Flynn et al.

(10) Number: US 6,837,957 C2

(45) Certificate Issued: Jul. 1, 2014

(54) METHOD FOR SEPARATION LABEL ASSEMBLY

(75) Inventors: Timothy J. Flynn, Key Largo, FL (US); Thomas E. Flynn, Crystal Lake, IL (US); Patrick J. Flynn, Redlands, CA (US)

(73) Assignee: Firstmerit Bank, N.A., Akron, OH (US)

Reexamination Request:
No. 90/020,032, Sep. 21, 2012

Reexamination Certificate for:

| | |
|---|---|
| Patent No.: | **6,837,957** |
| Issued: | **Jan. 4, 2005** |
| Appl. No.: | **10/390,338** |
| Filed: | **Mar. 17, 2003** |

Reexamination Certificate C1 6,837,957 issued Dec. 12, 2012

Certificate of Correction issued Apr. 23, 2013

(51) Int. Cl.

| | |
|---|---|
| ***B41J 3/407*** | (2006.01) |
| ***G09F 3/02*** | (2006.01) |
| ***G09F 3/00*** | (2006.01) |

(52) U.S. Cl.
CPC .................................... *G09F 3/0288* (2013.01)
USPC ............................ 156/252; 156/277; 156/289

(58) Field of Classification Search
None
See application file for complete search history.

(56) References Cited

To view the complete listing of prior art documents cited during the proceeding for Reexamination Control Number 90/020,032, please refer to the USPTO's public Patent Application Information Retrieval (PAIR) system under the Display References tab.

*Primary Examiner* — Elizabeth McKane

(57) ABSTRACT

A label assembly having a face sheet adhered to a back sheet. A separation line includes at least one first tearable line of separation extending across the face sheet and a second tearable line of separation extending across the back sheet. Each first tearable line of separation is offset with respect to the second tearable line of separation. In a method for printing a plurality of portions of the label assembly, the label assembly is routed through a printer and print is applied to a first portion of the label assembly. The first portion is separated from a second portion and the second portion is routed through a printer and print is applied to the second portion of the label assembly.

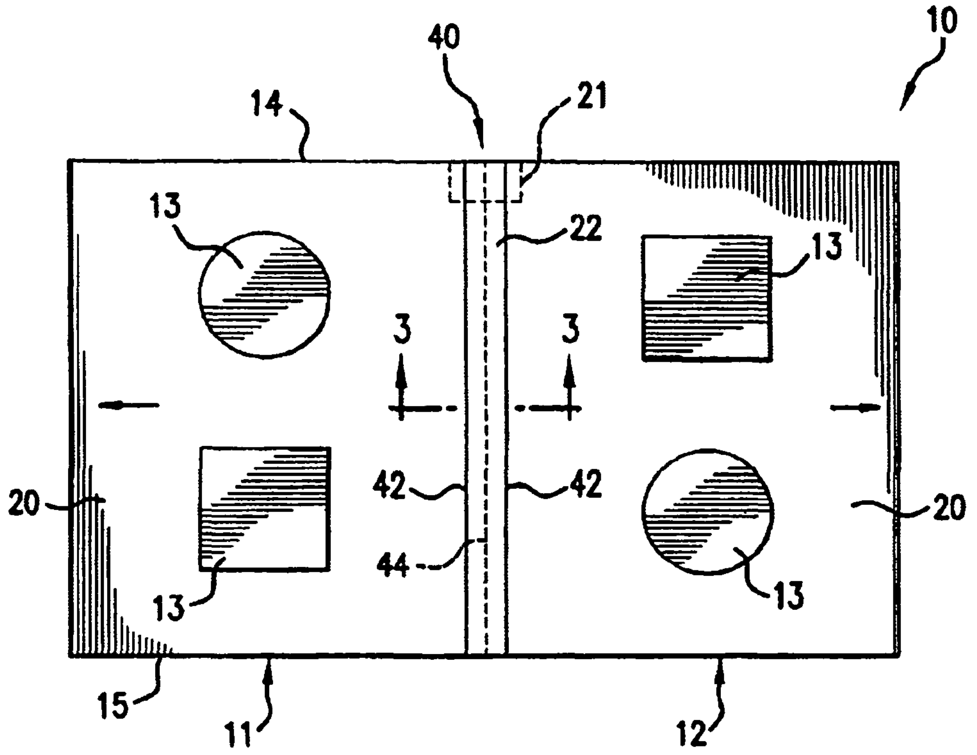

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 5-12 and 15-20 were previously cancelled.

Claims 3, 4, 13, 14, 25 and 28 are cancelled.

Claims 21-24, 26, 27, 29 and 31 are determined to be patentable as amended.

Claims 30 and 32, dependent on an amended claim, are determined to be patentable.

New claims 33-42 are added and determined to be patentable.

21. A method for separating a label assembly having a face sheet adhered to a back sheet. the method comprising:

removing a strip on the face sheet *off the back sheet, the strip* positioned between two corresponding first tearable lines of separation each extending between a first edge portion and an opposing second edge portion of the label assembly, and *the removing the strip* exposing a second tearable line of separation on the back sheet, the second tearable line of separation including a portion intersecting with the face sheet upon removal of the strip;

separating the back sheet along the second tearable line of separation extending between the first edge portion and the second edge portion of the label assembly which is offset with respect to each first tearable line of separation to separate a first portion of the label assembly and a second portion of the label assembly; and routing a separated portion through a printer.

22. A method for printing a plurality of portions of a label assembly having a face sheet adhered to a back sheet, the method comprising:

routing the label assembly through a printer and printing on *a label of* a first portion of the label assembly;

removing a strip on the face sheet *off the back sheet, the strip* positioned between two corresponding first tearable lines of separation each extending between a first edge portion and an opposing second edge portion of the label assembly, and *the removing the strip* exposing a second tearable line of separation on the hack sheet, the second tearable line of separation including a portion intersecting with the face sheet upon removal of the strip;

separating the first portion of the label assembly from a second portion of the label assembly along the second tearable line of separation, wherein each first tearable line of separation is offset with respect to the second tearable line of separation; and routing the second portion of the label assembly through a printer and printing on *a label of* the second portion of the label assembly.

23. A method for separating a label assembly having face sheet adhered to a back sheet, the method comprising:

removing a strip on the face sheet *off the back sheet, the strip* positioned between two corresponding first tearable lines of separation each extending between and stopping short of a first edge portion and an opposing second edge portion of the label assembly, and *the removing the strip* exposing a second tearable line of separation on the back sheet, with the strip removed the second tearable line of separation intersecting the face sheet;

separating the back sheet along the second tearable line of separation extending between the first edge portion and the second edge portion of the label assembly which is offset with respect to each first tearable line of separation to separate a first portion of the label assembly and a second portion of the label assembly; and routing a separated portion through a printer.

24. The method according to claim 23, wherein *with the strip removed* the second tearable line of separation intersects a structure of the face sheet.

26. A method for printing a plurality of portions of a label assembly having a face sheet adhered to a back sheet, the method comprising:

routing the label assembly through a printer and printing on *a label of* a first portion of the label assembly;

removing a strip on the face sheet *off the back sheet, the strip* positioned between two corresponding first tearable lines of separation each extending between and stopping short of a first edge portion and an opposing second edge portion of the label assembly, and *the removing the strip* exposing a second tearable line of separation on the back sheet;

separating the first portion of the label assembly from a second portion of the label assembly along the second tearable line of separation, wherein each first tearable line of separation is offset with respect to the second tearable line of separation, with the strip removed the second tearable line of separation intersecting the face sheet; and routing the second portion of the label assembly through a printer and printing on *a label of* the second portion of the label assembly.

27. The method according to claim 26, wherein *with the strip removed* the second tearable line of separation intersects a structure of the thee sheet.

29. A method for separating a label assembly having a face sheet adhered to a back sheet, the method comprising:

removing a strip on the face sheet *off the back sheet, the strip* positioned between two corresponding first tearable lines of separation each extending between and stopping short of a first edge portion and an opposing second edge portion of the label assembly, and *the removing the strip* exposing a second tearable line of separation on the back sheet, the second tearable line of separation stopping short of the first edge portion and a third tearable line of separation positioned between an end of the second tearable line of separation and the first edge portion*, wherein the third tearable line of separation has a different line of weakening structure type than the second tearable line of separation*;

separating the back sheet along the second tearable line of separation and the third tearable line of separation extending between the first edge portion and the second edge portion of the label assembly which is offset with respect to each first tearable line of separation to separate a first portion of the label assembly and a second portion of the label assembly; and routing a separated portion through a printer.

31. A method for printing a plurality of portions of a label assembly having a face sheet adhered to a back sheet, the method comprising:

routing the label assembly through a printer and printing on *a label of* a first portion of the label assembly;

removing a strip on the face sheet *off the back sheet, the strip* positioned between two corresponding first tearable lines of separation each extending between and stopping short of a first edge portion and an opposing second edge portion of the label assembly, and *the removing the strip* exposing a second tearable line of separation on the back sheet, the second tearable line of separation stopping short of the first edge portion and a third tearable line of separation positioned between an end of the second tearable line of separation and the first edge portion*, wherein the third tearable line of separation is a different line of weakening type than the second tearable line of separation*;

separating the first portion of the label assembly from a second portion of the label assembly along the second tearable line of separation and the third tearable line of separation, wherein each first tearable line of separation is offset with respect to the second tearable line of separation; and routing the second portion of the label assembly through a printer and printing on *a label* the second portion of the label assembly.

*33. The method according to claim 21, wherein removing the strip exposes an unseparated second tearable line of separation.*

*34. The method according to claim 22, wherein removing the strip exposes an unseparated second tearable line of separation.*

*35. The method according., to claim 23, wherein removing the strip exposes an unseparated second tearable line of separation.*

*36. The method according to claim 26, wherein removing the strip exposes an unseparated second tearable line of separation.*

*37. The method according to claim 33, wherein the second tearable line of separation comprises a non-linear path.*

*38. The method according to claim 37, wherein the second tearable line comprises a perforation line and a die cut line.*

*39. The method according to claim 35, wherein the second tearable line of separation comprises a non-linear path and a die cut line.*

*40. The method according to claim 29, wherein the second tearable line comprises a perforation line and the third tearable line comprises a microperforation line that is different than the perforation line.*

*41. The method according to claim 40, wherein the second tearable line of separation comprises a non-linear path.*

*42. The method according to claim 40, wherein the second tearable line of separation further comprises a non-linear path and a die cut line.*

* * * * *